United States Patent
Dajczak-Starego et al.

(10) Patent No.: US 10,974,581 B2
(45) Date of Patent: Apr. 13, 2021

(54) GLASS RUN CHANNEL ASSEMBLY AND METHOD FOR FORMING A GLASS RUN CHANNEL ASSEMBLY

(71) Applicant: COOPER STANDARD GMBH, Lindau (DE)

(72) Inventors: Klaudia Dajczak-Starego, Nowizna (PL); Jerzy Krakowiak, Bielawa (PL)

(73) Assignee: COOPER STANDARD GMBH, Lindau (DE)

( * ) Notice: Subject to any disclaimer, the term of this patent is extended or adjusted under 35 U.S.C. 154(b) by 121 days.

(21) Appl. No.: 15/728,535

(22) Filed: Oct. 10, 2017

(65) Prior Publication Data
US 2018/0104873 A1    Apr. 19, 2018

(30) Foreign Application Priority Data
Oct. 14, 2016  (EP) .................................... 16193930

(51) Int. Cl.
*B60J 10/15*    (2016.01)
*B29C 48/00*    (2019.01)
(Continued)

(52) U.S. Cl.
CPC ........... *B60J 10/15* (2016.02); *B29C 45/0062* (2013.01); *B29C 45/14065* (2013.01);
(Continued)

(58) Field of Classification Search
CPC .......... B29C 45/14262; B29C 45/1427; B29C 45/14065; B29C 45/14131; B60J 10/15–277; Y10T 428/24355
See application file for complete search history.

(56) References Cited

U.S. PATENT DOCUMENTS

| 5,424,019 | A | * | 6/1995 | Miyakawa | ............ | B29C 48/304 |
| | | | | | | 264/177.17 |
| 5,441,685 | A | * | 8/1995 | Miyakawa | ............... | B60J 10/17 |
| | | | | | | 156/244.18 |

(Continued)

FOREIGN PATENT DOCUMENTS

| CN | 203863916 U | 10/2014 |
| JP | 2003334916 A | 11/2003 |

OTHER PUBLICATIONS

Machine translation of CN 203863916 U, obtained from EspaceNet (Year: 2021).*

(Continued)

*Primary Examiner* — Z. Jim Yang
(74) *Attorney, Agent, or Firm* — Stephen T. Olson; Harness, Dickey & Pierce, P.L.C.

(57) ABSTRACT

A joint assembly comprising at least one extruded profile member and at least one molded member connected to the profile member by an injection molding process. The extruded profile member comprises at least one pre-processed structured surface area adapted to increase grip between the profile member and a molding tool during the molding process. A method for forming a joint assembly is also disclosed, comprising the steps of comprising: inserting an extruded profile member in a molding tool, the extruded profile member and/or the molding tool having a structured surface area to increase the friction between the molding tool and the extruded profile member; clamping the molding tool and bringing the structured surface in contact with the molding tool and/or the extruded profile member to hold the profile member in place, and injecting material into the molding tool to produce a molded member connected with the extruded profile member.

11 Claims, 4 Drawing Sheets

(51) Int. Cl.
    *B29C 45/00*     (2006.01)
    *B60J 5/04*     (2006.01)
    *B29C 45/14*     (2006.01)
    *B60J 10/76*     (2016.01)
    *B29K 623/00*     (2006.01)
    *B29L 31/30*     (2006.01)

(52) U.S. Cl.
    CPC .... *B29C 45/14311* (2013.01); *B29C 48/0021* (2019.02); *B60J 5/0402* (2013.01); *B60J 5/0406* (2013.01); *B60J 10/76* (2016.02); *B29C 2045/14131* (2013.01); *B29K 2623/16* (2013.01); *B29L 2031/302* (2013.01); *Y10T 428/24355* (2015.01)

(56) References Cited

U.S. PATENT DOCUMENTS

| | | | | |
|---|---|---|---|---|
| 5,997,793 | A * | 12/1999 | Lahnala | B29C 45/14377 |
| | | | | 264/252 |
| 6,416,706 | B1 * | 7/2002 | Fisher | B29C 45/14008 |
| | | | | 264/275 |
| 6,499,256 | B1 * | 12/2002 | Aritake | B60J 10/17 |
| | | | | 428/143 |
| 2002/0096800 | A1 | 7/2002 | Keeney et al. | |
| 2002/0185824 | A1 * | 12/2002 | Sakane | B60J 10/74 |
| | | | | 277/628 |
| 2005/0003158 | A1 * | 1/2005 | Yamasa | B60J 10/17 |
| | | | | 428/143 |
| 2005/0129911 | A1 * | 6/2005 | Royse | B60J 10/80 |
| | | | | 428/141 |
| 2005/0166317 | A1 * | 8/2005 | Kelly | A47D 13/06 |
| | | | | 5/110 |
| 2008/0070001 | A1 | 3/2008 | Lasarov et al. | |
| 2010/0199568 | A1 * | 8/2010 | Kondo | B60J 10/76 |
| | | | | 49/441 |
| 2013/0026716 | A1 * | 1/2013 | Nahrwold | F16D 3/845 |
| | | | | 277/634 |
| 2014/0033614 | A1 * | 2/2014 | Bartolomucci | B60J 10/18 |
| | | | | 49/506 |
| 2016/0082625 | A1 * | 3/2016 | Luukko | B29C 59/18 |
| | | | | 428/141 |
| 2017/0291480 | A1 * | 10/2017 | Kameoka | B60J 10/76 |

OTHER PUBLICATIONS

Machine translation of JP 2003/334916 A, obtained from EspaceNet (Year: 2021).*
European Search Report for EP 16193930.1; dated Mar. 22, 2017; 7 pp.
Office Action received for the Chinese Patent Application No. 201110958887.9, dated Dec. 2, 2020, 10 pages.

* cited by examiner

GLASS RUN CHANNEL ASSEMBLY AND METHOD FOR FORMING A GLASS RUN CHANNEL ASSEMBLY

The present application claims the priority of European patent application EP 16 193 930.1, filed on Oct. 14, 2016. The entire contents of this priority application is incorporated herein by reference.

BACKGROUND OF THE INVENTION

The present invention relates to a joint assembly and a method for forming such a joint assembly.

Joint assemblies, e.g. in the form of glass run channel assemblies, are used in automotive vehicles and the like, e.g. to support a window pane to move between an open and a closed position. The glass run channel guides and supports the window pane during and after translational movement and forms a seal between the window pane and the vehicle door or body structure. Thus, a glass run channel prevents weather elements from entering the passenger compartment, holds the window pane in position to prevent significant movement other than in an intended translational direction and yet allows window pane translational movement without undue resistance.

Such joint assemblies typically comprise at least an extrusion molded member, like an extruded profile member, and an injection molded member. In the manufacturing process, the extrusion molded (extruded) profile member is inserted in an injection molding tool and the injection molded member is then produced by injecting the material to overmold the extruded profile member.

Although this process and the respectively produced joint assembly has been proven advantageous, there is still a problem of a too high wastage percentage. In the transition portion between the injection molded member and the extrusion molded member, the problem of so-called "open joints" is encountered. Such an open joint is a portion where the injection molded member comprises a notch or slot where no injection molded material is present. Such open joints are not acceptable, for example for optical and stability reasons with the consequence that the respective glass run channel assembly has to be sorted out as wastage.

SUMMARY OF THE INVENTION

In view of the above, it is an object of the present invention to provide a joint assembly and a respective method for forming such a joint assembly which overcome the above-mentioned problem. In particular, the produced joint assemblies should not have open joints after production.

This object is solved by a joint assembly as defined in claim 1 and a method for forming a joint assembly as defined in claim 9.

In particular, the joint assembly according to the invention comprises at least one extruded profile member, and at least one molded (injection molded) member connected to the profile member, wherein the extruded profile member comprises at least one pre-processed structured surface area adapted to increase grip and friction, respectively, between the profile member and a molding tool during the molding process.

In the context of the present disclosure, "joint assembly" generally defines an assembly which comprises at least one extruded profile member and at least one molded (injection molded) member, both members being joint together by a molding process.

Such a joint assembly may be provided as a glass run channel assembly, an encapsulation assembly or a body seal assembly, as to mention just a few. Preferably the joint assembly is a sealing structure in a vehicle, preferably an automotive vehicle.

The inventors have surprisingly recognized that when injecting the mold, the extruded profile member inserted into the molding tool is at least slightly moved by the pressure of the injected mold. This movement of the extruded profile member within the molding tool results in the effect that the injected mold is not distributed evenly. That means in other words that there are areas in the molding tool which are not filled by the injected mold. These areas then result in the "open joints" in the produced product.

In order to avoid these slight movements of the extruded profile member inserted into the molding tool, the clamping grip between the molding tool and the extruded profile member is increased by providing a pre-processed structured surface area on the extruded profile member.

This means that a specific area of the extruded profile member, which comes in contact with the molding tool upon clamping the molding tool, is provided with a surface structure adapted to increase the frictional force. By increasing the frictional force, the tendency of slight movement of the extruded profile member in the molding tool is substantially decreased with the advantageous result that the space within the molding tool is evenly filled with the mold material.

Hence, one of the main aspects of the present invention is to provide a structured surface area on the extruded profile member as to increase the frictional force during the injection molding process. The extruded profile member is thus securely held in place in the molding tool and the injected molding material can evenly fill the respective space in the molding tool.

In a preferred embodiment, the profile member comprises EPDM material (ethylene propylene diene monomer rubber). The profile member may also comprise a thermoplastic material. The molded member comprises a moldable, preferably an injection moldable, thermoplastic material. The molded member may also comprise EPDM material.

In a preferred embodiment, the structured surface area has a predefined roughness between 36 and 41, preferably 38 to 40, more preferably 39 according to VDI 3400. VDI 3400 is a known guideline defining for example surfaces of plastic elements. In particular, this guideline provides a specific definition of surface roughness, particularly of plastic material.

Using a roughness of 39 has surprisingly shown a very advantageous result not only in terms of decrease of wastage but also in terms of strength. This means that e.g. the tensile strength of the connection between the extruded profile member and the molded member is increased compared to former processes not using structured surfaces.

In a preferred embodiment, the roughness of the structured surface is provided by an erosion process.

The advantage of this process is in particular low cost and high precision.

In a further preferred embodiment the structured surface area is provided at an end portion, preferably a longitudinal end portion of the profile member.

The inventors have surprisingly recognized that in particular the end portions of the profile member tend to slightly move during the injection process so that providing these areas with the frictional force increasing structure is advantageous.

In a further preferred embodiment, several extruded profile members are provided each of them comprising at least one structured surface and at least two of the profile members are connected with each other by the molded member. More preferably, several molded members are provided.

As already mentioned before, the object of the present invention is also solved by a method for forming a joint assembly comprising:
  Inserting an extruded profile member in a molding tool, the extruded profile member and/or the molding tool being provided with a structured surface area;
  clamping the molding tool and bringing the structured surface in contact with the molding tool and/or the extruded profile member as to hold the profile member in place, and
  injecting material into the molding tool as to produce a molded member connected with the extruded profile member The method according to the present invention achieves the object by increasing the frictional force between the extruded profile member and the molding tool. The frictional force may be increased by providing the structured surface area on the extruded profile member, preferably at its longitudinal end portion facing the molding tool, and/or at a respective opposing surface area of the molding tool.

Preferably, the structured surface area is structured by an erosion process.

Preferably, the joint assembly is provided as a glass run channel assembly for a vehicle, preferably an automotive vehicle.

BRIEF DESCRIPTION OF THE DRAWINGS

It is to be understood that the features mentioned above and those yet to be explained below can be used not only in the respective combinations indicated, but also in other combinations or in isolation without leaving the scope of the present invention. Further features and advantages can be taken from the following description and the enclosed drawings. An embodiment of the invention is shown in the drawings and will be explained in more detail in the description below with reference to same. In the drawings.

DETAILED DESCRIPTION OF THE PREFERRED EMBODIMENTS

Figure 1:
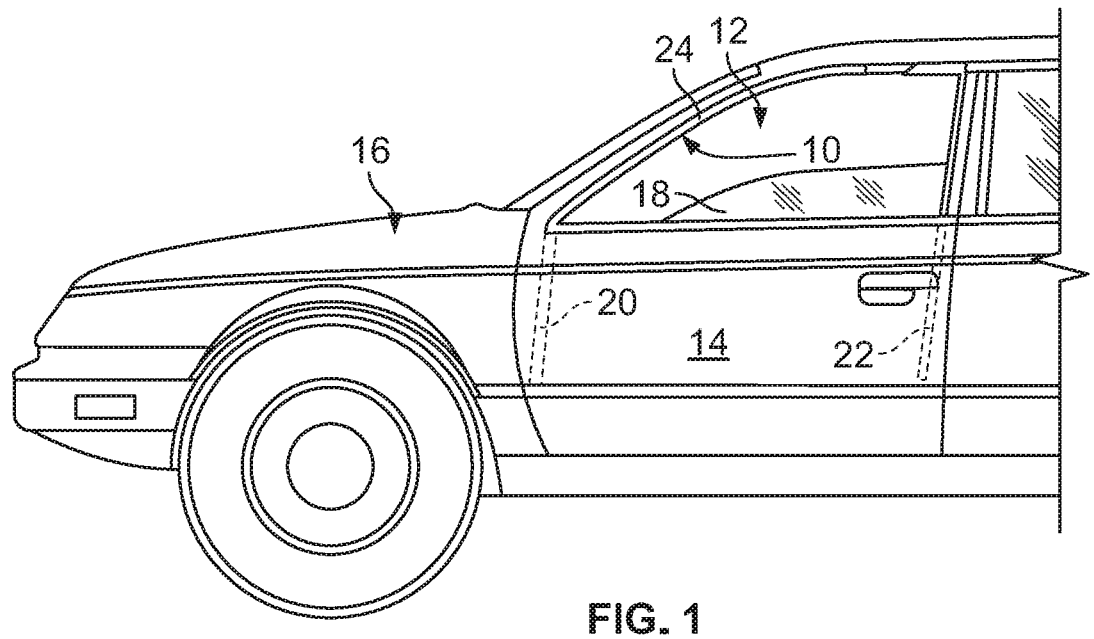
FIG. 1 is a partial elevational view of a vehicle having a preferred embodiment of a glass run channel assembly according to the present invention.

Referring now to FIG. 1 of the drawings, there is shown a preferred embodiment of a joint assembly of the present invention in form of a glass run channel assembly indicated generally by the numeral 10. Glass run channel assembly 10 is installed in window aperture 12 of door 14 of an automatic vehicle 16 and is shown in operative association with window pane 18 which is vertically translational between open and closed positions as is conventional in modern automotive vehicles. Glass run channel assembly 10 is a continuous elongated assembly with vertically extending lengths 20 and 22 and generally horizontally extending header 24. Vertically extending lengths 20 and 22 of glass run channel assembly 10 extend within door 14 to support window pane 18 when pane 18 is in an open position. Lengths 20 and 22 are joined to header 24 for example by a molded member which will be described in detail below.

It is to be noted that the glass run channel assembly 10 described in detail below is merely one illustrative embodiment of many embodiments representing a joint assembly. The present invention should not be considered to be limited to a glass run channel assembly.

Figure 2:
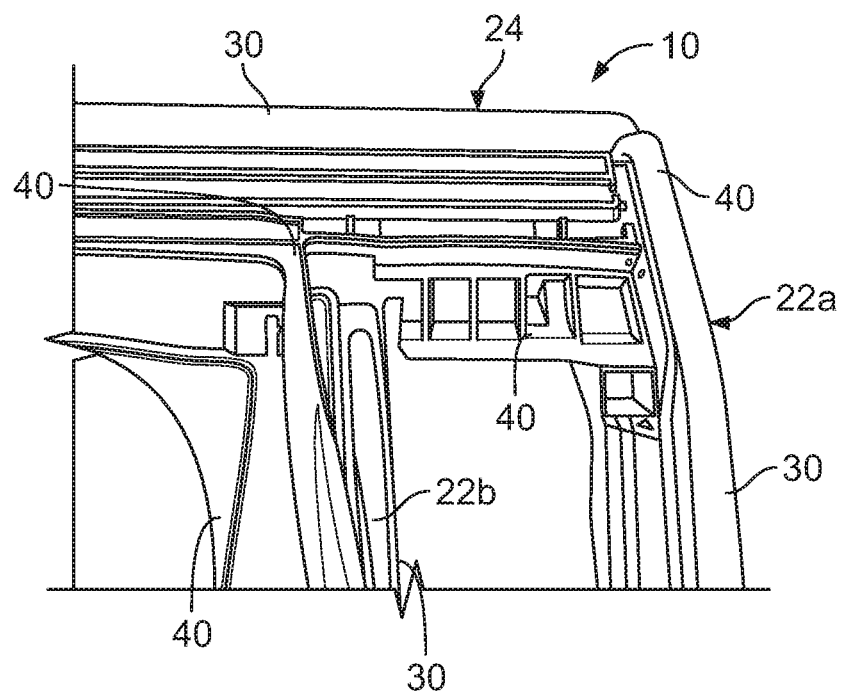
FIG. 2 is a partial view of a corner portion of a glass run channel assembly.

Referring now to FIG. 2, a portion, in particular a corner portion of a glass run channel assembly 10 is shown. In this corner portion, the vertical extending lengths 22a, 22b and the horizontally extending header 24 are connected with each other to form this corner portion.

For stability and esthetic reasons, the glass run channel assembly 10 is buildup of preferably rigid extrusion molded profile members (also called extruded profile member) 30 and injection molded members 40 (also called molded member) connecting the extruded members 30 with each other. The profile members 30 may also be provided as soft extrusion molded profile members. The molded members 40 may also be provided as soft molded members 40.

The extruded profile members 30 are inserted into an injection molding tool as to produce the assembly 10 by over-molding the inserted extruded profile members 30 with the molded members 40.

Figure 3:
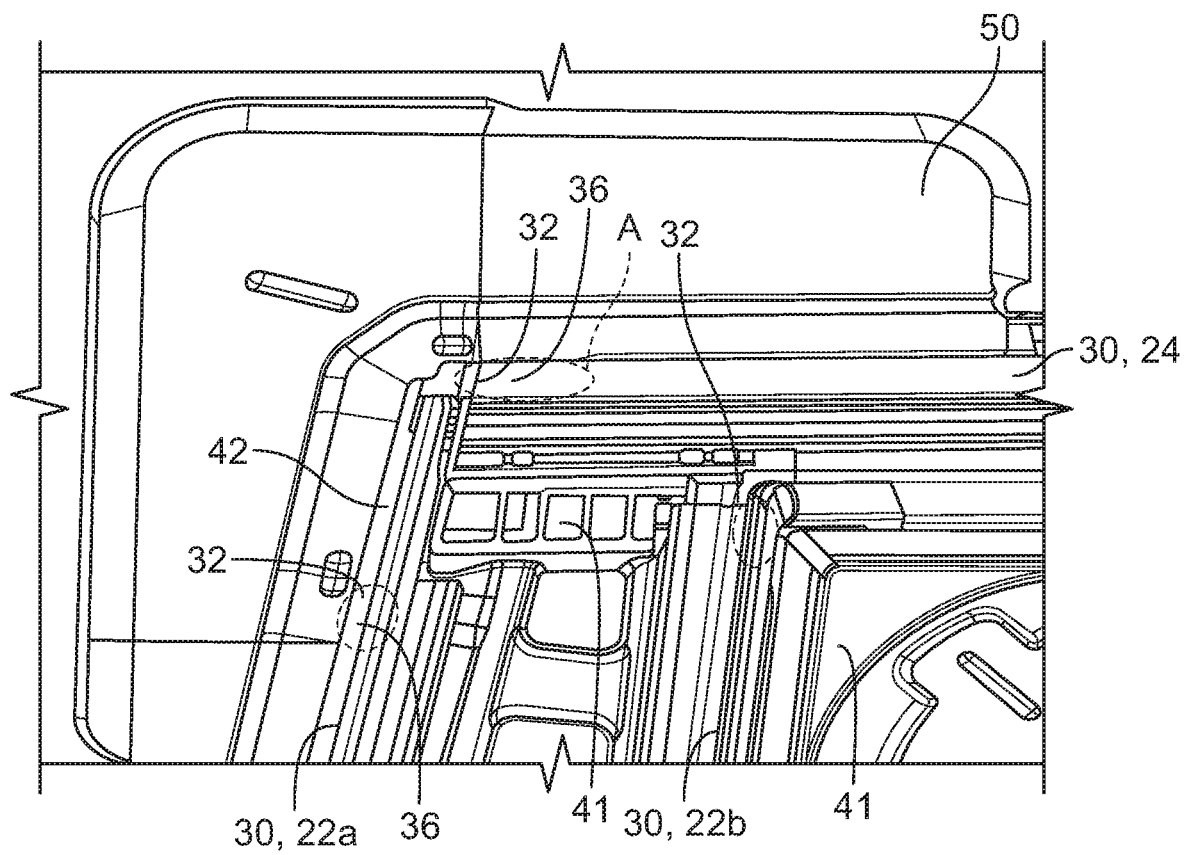
FIG. 3 is a partial view of the molding tool with profile members inserted for producing the glass run channel shown in FIG. 2.

In FIG. 3, a portion of one half of a molding tool for an injection molding process is shown and designated with reference numeral 50. This figure clearly shows for example cavities 41, 42 necessary for forming the molded members 40.

Further, FIG. 3 shows inserted extruded profile members 30 forming the vertical extending length 22a, 22b and the horizontally extending header 24, respectively.

It is also apparent from FIG. 3 that the extruded profile members 30 do not abut or contact each other. Rather, the extruded profile members 30 end at edges 32 and are connected with each other via molded members 40. These molded members 40 are formed during the injection molded process by filling cavities 41, 42

Figure 4:
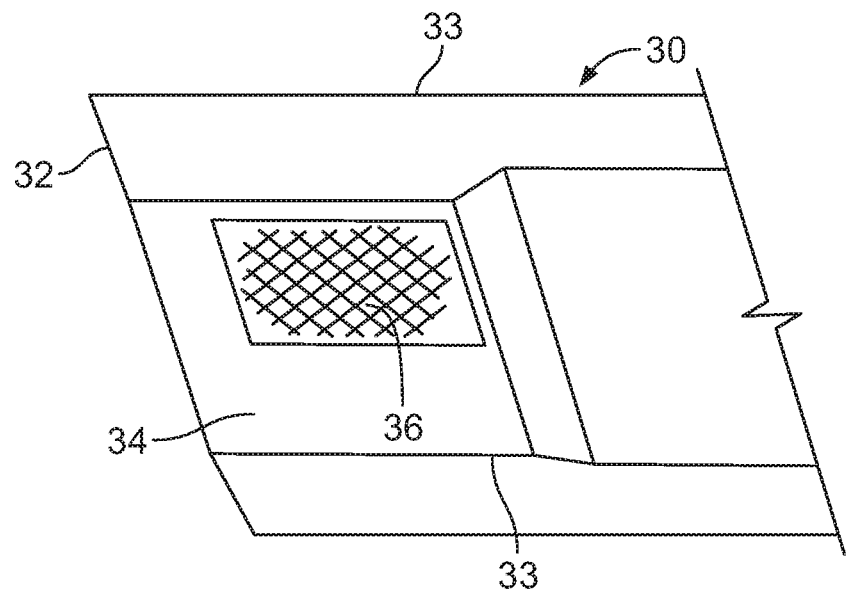
FIG. 4 is a partial view of a profile member before being inserted into the molding tool.

Referring to FIG. 4, an end portion of the extruded profile member 30 of the horizontally extending header 24 is shown. The extruded profile member 30 may have a longitudinal form with e.g. a rectangular cross-section. However, it is to be understood that the profile member may have any design being producible by an extrusion molding process.

The profile member 30 has a surface 34 which faces the molding tool when inserted. This surface 34 gets in contact with the molding tool at least partially. This contact serves to hold the profile member 30 in the molding tool by clamping.

A predetermined area of the surface 34 of the profile member, which is designated by numeral 36, is processed as to roughen its surface. This roughened surface area 36 is provided at the longitudinal end portion of the profile member 30, preferably about 2 cm apart from the edge 32 and longitudinal extending edges 33 and serves to increase the frictional forces.

The surface area 36 is selected such that it is in full contact with the molding tool and is dimensioned such that the roughened surface area 36 provides a frictional force high enough to avoid any movement during the injection process. Or in other words, the roughened surface area increases the frictional coefficient between the profile member and the molding tool upon clamping.

Although the shown embodiment comprises just a single structured surface area 36, it is apparent that further structured surface areas 36 may be provided on the surface 34 of the profile member 30. Moreover, also a surface opposite to the surface 34 may be provided with structured surface areas 36.

It is also apparent that the area of the molding tool getting in contact with the surface area 36 of the profile member may also be provided as a structured surface area 36. Or instead of having the structured surface area on the profile member 36, it may be provided solely on the molding tool at an area facing the profile member, preferably facing an end portion of the profile member. The intended effect of increasing the frictional coefficient between the profile member and the molding tool is also achievable with such an alternative embodiment. However, structuring the surface area of the profile member is advantageous.

A roughness value of 39 according to the known regulation VDI 3400 has been proved as advantageous in terms of friction in relation to dimension of the area. However, values in the range of 36 to 41 would also be useable.

Figure 5:
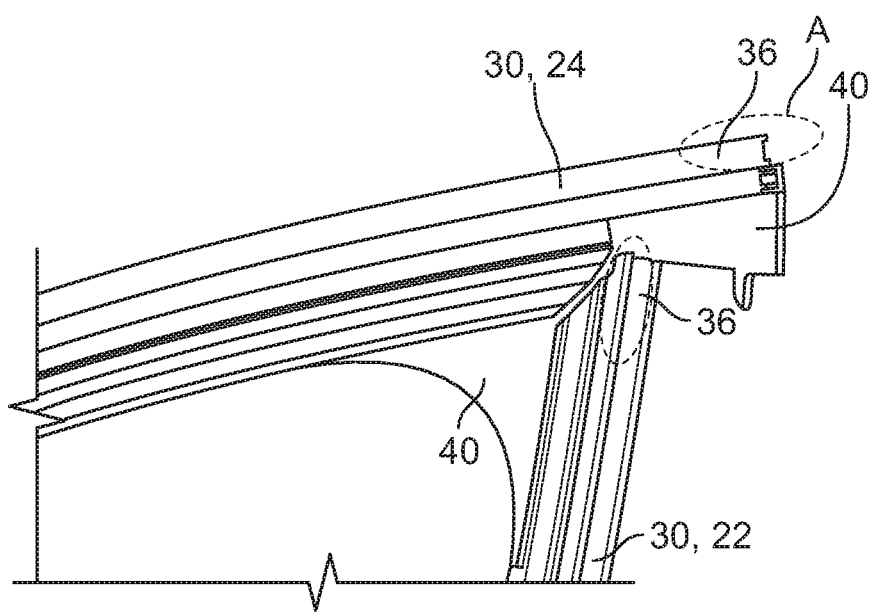
FIG. 5 is a further example of a glass run channel assembly.
Figure 6:
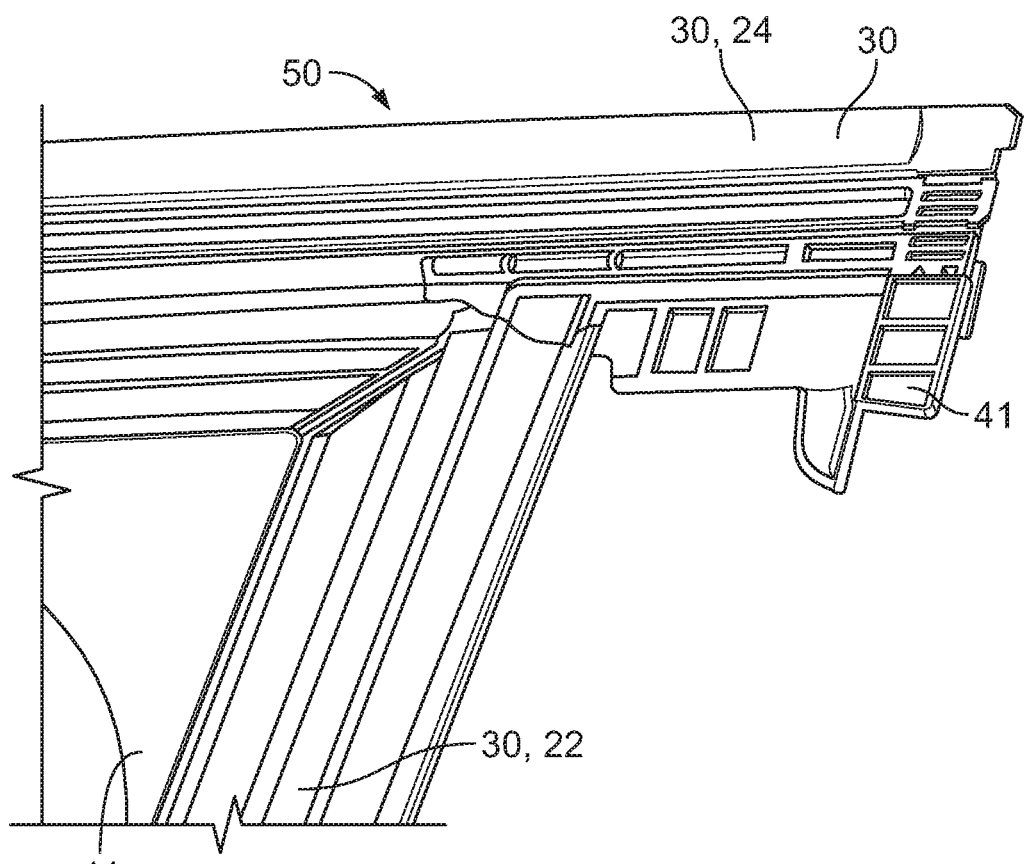
FIG. 6 is the respective partial view of the molding tool for producing the glass run channel as shown in FIG. 5.

In FIGS. 5 and 6, a further embodiment of a glass run channel assembly 10 is shown wherein same reference numerals designate same parts as in FIGS. 2 and 3.

It is apparent from FIG. 5 that two profile members 30 are connected by a molded member 40. As to hold the profile members securely in place in the molding tool 50, they are provided with structured surface areas 36 at their longitudinal end portions.

Figure 7:
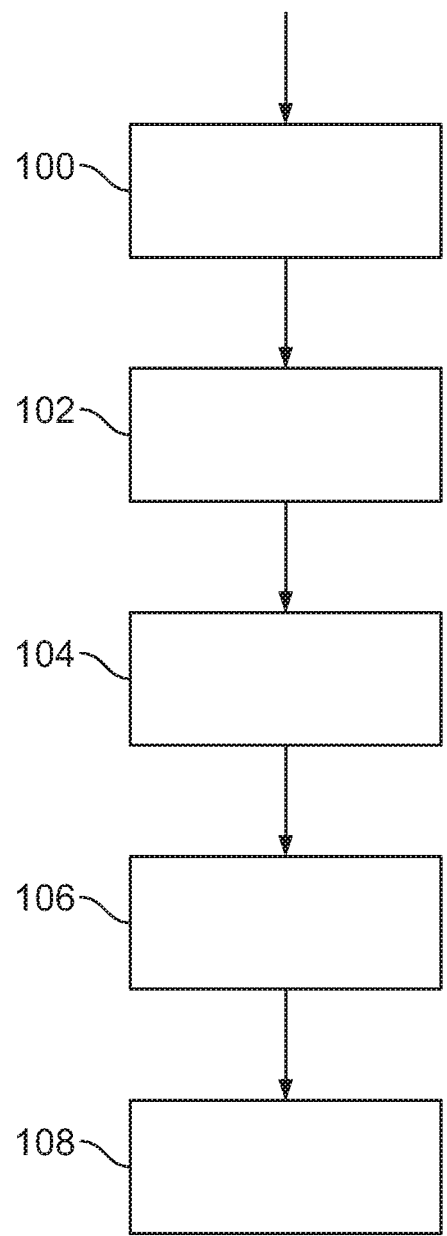
FIG. 7 is a flow diagram showing the method for forming the glass run channel assembly according to the invention.

Referring now to FIG. 7, the method for forming the glass run channel assembly 10 is described.

First, in step 100, the profile members are produced by an extrusion molding process. The material selected for the profile members is preferably EPDM, however other materials like thermoplastic materials would also be possible.

Next, in step 102, the structured surface areas 36 are provided. Preferably, an erosion process is used to roughen the surface as to achieve a value of 39 according to VDI 3400. In the event that only the molding tool comprises the structured surface areas, this step could be omitted.

The pre-manufactured profile members 30 are then inserted in step 104 into the molding tool (which comprises two halves), e.g. as shown in FIG. 3. The two halves of the molding tool are then closed and clamped together. This clamping action on the one hand serves to seal the molding tool and on the other hand clamps the inserted profile members between both halves to hold them securely in place.

Due to the fact the structured surface areas 36 of the profile members and/or the molding tool are in contact with the molding tool and/or the profile members, respectively, the friction between the profile members and the molding tool is increased. This increased friction force prevents the profile member from moving during the injection process. Hence at least the longitudinal end portions of the profile members provided with the structured areas 36 are unmovably hold in place.

Then, in step 106, a mold material, preferably rubber or a thermoplastic or EPDM material is injected into the molding tool filling the cavities and also connecting the profile members with each other. Although the mold material is injected with high pressure, the longitudinal end portions of the profile member do not move owing to the increased friction force between the profile member and the molding tool.

In the next step 108, both halves of the molding tool are opened and the glass run channel assembly 10 is ejected.

The effect of the secure holding of the profile members 30 in the molding tool is manifold. For example, the wastage caused by open joints in a transition portion between the profile member 30 and the molded member 40 is drastically reduced. Further, the tensile strength between the profile member 30 and the molded member 40 is increased so that the stability of the whole glass run channel assembly is improved.

To sum up the present invention provides a joint assembly which is substantially improved only at the cost of a very simple further process step, namely the step of structuring a small area of the profile member (and/or the molding tool) which could be done independently of the injection molding step.

What is claimed is:

1. A joint assembly comprising:
at least one extruded profile member having a molding tool facing surface; and
at least one molded member connected to the at least one extruded profile member by an injection molding process, the at least one molded member delimited by an outer periphery thereof;
wherein the at least one extruded profile member comprises at least one pre-processed structured surface area on the molding tool facing surface adapted to increase grip between the at least one profile member and a molding tool during the injection molding process,
wherein the at least one pre-processed structured surface area has a predefined roughness between 36 and 41 according to VDI 3400, and
wherein the outer periphery of the at least one molded member does not completely occlude the at least one pre-processed structured surface area of the at least one extruded profile member such that at least a portion of the at least one pre-processed structured surface area remains exposed.

2. The joint assembly according to claim 1, wherein the at least one profile member is selected from a group consisting of EPDM, a moldable thermoplastic material, and combinations thereof.

3. The joint assembly according to claim 1, wherein the at least one pre-processed structured surface area has a predefined roughness between 38 and 40 according to VDI 3400.

4. The joint assembly according to claim 1, wherein the at least one pre-processed structured surface area has a predefined roughness of 39 according to VDI 3400.

5. The joint assembly according to claim 1, wherein the roughness is provided by an erosion process.

6. The joint assembly according to claim 1, wherein the at least one pre-processed structured surface area is provided at a longitudinal end portion of the at least one profile member.

7. The joint assembly according to claim 1, wherein several extruded profile members are provided, each of them comprising at least one structured surface area, and wherein at least two of the profile members are connected with each other by the at least one molded member.

8. The joint assembly according to claim 1, wherein several molded members are provided.

9. The joint assembly according to claim 1, wherein the joint assembly is a glass run channel assembly.

10. The joint assembly of claim 1 in combination with the molding tool, the at least one pre-processed structured surface area contacting the molding tool.

11. A method of forming the joint assembly of claim 1, the method comprising:
- inserting the at least one extruded profile member in the molding tool; clamping the molding tool and bringing the at least one pre-processed structured surface of the at least one extruded profile member in contact with the molding tool to hold the at least one extruded profile member in place; and
- injecting material into the molding tool as to produce the at least one molded member connected with the at least one extruded profile member.

* * * * *